Patented July 8, 1952

2,602,824

UNITED STATES PATENT OFFICE 2,602,824

METHOD OF PRODUCING LIQUID POLYMERIC CHLOROTRIFLUOROETHYLENE

John J. Padbury, Stamford, and Edward L. Kropa, Old Greenwich, Conn., assignors to American Cyanamid Company, New York, N. Y., a corporation of Maine No Drawing. Application March 31, 1949, Serial No. 84,727

7 Claims. (Cl. 260—653)

This invention relates to an improved method of producing liquid polymeric chlorotrifluoroethylene, and is especially concerned with such a method which comprises contacting monomeric chlorotrifluoroethylene in the vapor phase and at a temperature within the range of 150° C. to 460° C., preferably from about 200° C. to about 400° C., with an alcoholic peroxide catalyst (more particularly an alkyl peroxide catalyst) which also is heated within the aforementioned temperature range. We prefer to use an alcoholic peroxide catalyst which is normally a liquid and which is or may be in the vapor phase at the polymerization temperature employed, specifically such a catalyst which is selected from the class consisting of di-(tert.-butyl) peroxide, 2,2-bis(tert.-butylperoxy)butane and mixtures thereof. The amount of catalyst and the time of contact between the catalyst and the monomeric chlorotrifluoroethylene are sufficient to form a substantial amount of polymeric chlorotrifluoroethylene which is liquid at room temperature (about 20°-30° C.) and at atomspheric pressure. Thereafter the liquid polymeric chlorotrifluoroethylene is isolated, e. g., by fractional condensation, from unpolymerized chlorotrifluoroethylene.

It was known prior to our invention that liquid polymers of chlorotrifluoroethylene could be produced. One method of obtaining such liquid polymers is disclosed in our copending application Serial No. 745,646 filed May 2, 1947, now Patent No. 2,543,530, issued February 27, 1951. The invention claimed in that application is concerned with the pyrolysis of polymeric chlorotrifluoroethylene, more particularly with the pyrolysis of solid polymers of chlorotrifluoroethylene, whereby various pyrolysis products are obtained including a substantial amount of monomeric chlorotrifluoroethylene. As also is pointed out in that application the pyrolysis products include polymers of lower molecular weight than the polymer which was pyrolyzed, which low-molecular-weight polymers may be obtained in the form of oils, greases, waxes, etc. The process described in that application is particularly adapted for use in the conversion of solid polymers of chlorotrifluoroethylene, for example such material in the form of waste scrap, to monomeric chlorotrifluoroethylene, but is not especially adapted for use in the production of high yields of liquid polymers of chlorotrifluoroethylene from solid polymers of this same material.

Another method for the preparation of liquid polymers of chlorotrifluoroethylene involves batch-wise polymerization of solutions of the monomer. This method likewise has not been entirely satisfactory. Such batch processes have involved the use of large volumes of solvent, since, in order to obtain a polymer which was sufficiently low in molecular weight, the concentration of monomer in the solvent necessarily had to be limited to about 10%.

The present invention is based on our discovery that stable, high-boiling liquid polymers of chlorotrifluoroethylene can be obtained in high, overall yields by the catalyzed vapor-phase polymerization of monomeric chlorotrifluoroethylene. The process can be carried out continuously, with obvious advantages, and does not require the use of expensive pressure equipment. It was surprisingly found that not all peroxide catalysts are adapted for catalyzing the vapor-phase polymerization of monomeric chlorotrifluoroethylene. More particularly we have found that suitable peroxide catalysts for effecting this vapor-phase polymerization of monomeric chlorotrifluoroethylene are normally liquid alcoholic peroxides, specifically di-(tert.-butyl) peroxide, 2,2-bis(tert.-butylperoxy)butane and mixtures of these peroxides. Acetyl peroxide (an acidic peroxide) was found to be ineffective for the vapor-phase polymerization of monomeric chlorotrifluoroethylene. The amount of the catalyst may be varied as desired or as conditions may require, but usually is within the range of from about 0.5% to about 10% by weight of the monomeric chlorotrifluoroethylene, e. g., from about 1% to about 7% by weight thereof.

In order that those skilled in the art better may understand how our invention can be carried into effect the following description thereof is given, including the results of a series of tests with different peroxy catalysts, these results being set forth in tabular form for purpose of brevity.

The apparatus employed in carrying out the tests, which will be described more fully hereafter, included a polymerization tube which was constructed from a 40-inch length of heavy-walled Pyrex combustion tubing (25 mm. outside diameter and 18 mm. inside diameter), to either end of which was sealed a standard taper joint. A thermocouple well, which extended the length of the polymerization tube, was sealed to an adaptor that fitted the input or top end of the tube. This adaptor also was provided with connections for feeding the catalyst and monomeric chlorotrifluoroethylene thereto. The polymerization tube arranged vertically and unpacked, was heated over a 36-inch section by means of an electric furnace which surrounded the tube. Suitable means was provided for controlling the temperature of the main heaters and of the ring heaters which were attached to the ends of the furnace. In calculating the time that a given unit monomeric chlorotrifluoroethylene was maintained in the polymerization zone, a practical average temperature was taken over a 24-inch section of the polymerization tube.

The chlorotrifluoroethylene was fed directly into the polymerization tube, its rate being determined by passage through a liquid level flowmeter. For introducing the catalyst to the polymerization tube, a constant-rate, plunger-feed system was connected to the polymerization tube. In assembling the apparatus care was taken to provide for continuous flow of the catalyst and to avoid drop formation which would have defeated the purpose of a slow, constant-rate feed. The catalyst entered the reaction tube at a point 2½ inches above the top of the furnace and at the same level that the monomeric chlorotrifluoroethylene was introduced from the opposite side. The lower end of the reaction or polymerization tube was connected through a short condenser to a receiver flask cooled in ice. Dry Ice (solid carbon dioxide) traps were arranged to collect unreacted chlorotrifluoroethylene.

In carrying out the tests the furnace was first brought to temperature, the system was flushed with an inert gas, specifically nitrogen, and the feed of monomer and of catalyst was then started. To prevent any back diffusion of gases from the reaction tube a slow stream (approximately 0.5 liter per hour) of nitrogen was introduced at the top of the plunger feed system during the run. The product which was collected in the receiving flask was either a yellow or brown liquid. In determining the percent conversion, the weight of catalyst introduced to the reaction tube during the run was subtracted from the weight of liquid material which was collected. The material collected in the dry ice traps comprised mainly unreacted monomeric chlorotrifluoroethylene and, probably also, small amounts of low-boiling decomposition products of the catalyst.

The results of a number of different runs are summarized in Table I.

| Cut | Boiling Point, °C. | Amount in Grams |
|---|---|---|
| 1 | 59–60.5 (760 mm.) | 1.8 |
| 2 | 43–115 (21 mm.) | 1.3 |
| 3 | 115 (21 mm.)–212 (0.3 mm.) | 11.2 |
| Residue (viscous liquid) | | 3.4 |

Cut 3 was a clear, straw-colored and somewhat viscous liquid. Cryoscopic determination of molecular weight, using benzene as the solvent, gave values of 483 and 448, indicating that cut 3 comprised mainly the tetramer of chlorotrifluoroethylene. Like oils of similar boiling point obtained by the thermal cracking of polychlorotrifluoroethylene, the material of cut 3 was found to be a solvent, at elevated temperature, for high-molecular-weight polychlorotrifluoroethylene. Exposure of a sample of cut 3 to elemental fluorine at room temperature, for four hours produced little change; some turbidity developed but there was no apparent increase in viscosity.

Distillation of the product from run No. 2 gave fractions as follows:

| Cut | Boiling Point, °C. | Amount in Grams |
|---|---|---|
| 1 | 58–66 (760 mm.) | 1.3 |
| 2 | 61–100 (20 mm.) | 0.2 |
| 3 | 100 (20 mm.)–192 (0.18 mm.) | 6.3 |
| Residue (dark viscous liquid) | | 2.2 |

| Analysis of Cut 3 | Per Cent C | Per Cent H | Per Cent Cl | Mol. Wt. |
|---|---|---|---|---|
| Calculated for $(C_2F_3Cl)_z$ | 20.6 | 0.0 | 30.4 | |
| Found | {23.42 | 1.24 | 30.49 | 397 |
| | {23.29 | 1.32 | 30.17 | 445 |

The liquid product from Run No. 3 was also distilled with the following results:

| Cut | Boiling Point, °C. | Amount in Grams |
|---|---|---|
| 1 | 43–134 (760 mm.) | 10.5 |
| 2 | 143 (760 mm.)–165 (22 mm.) | 10.8 |

Table I

| Run No. | $CF_2=CFCl$ Feed | | Catalyst | | | Average Temp., °C. | Contact Time Sec. | Total Liquid Product Gms. | Conversion[1] Per Cent | $CF_2=CFCl$ Recovered, Gms. | Material Bal., Per Cent |
|---|---|---|---|---|---|---|---|---|---|---|---|
| | Total Gms. | Gms. per Hr. | Type | Per Cent In Feed | Total Wt., Gms. | | | | | | |
| 1 | 89 | 21.8 | Di-(t.-butyl) peroxide | 6.9 | 6.1 | 280 | 62 | 22.8 | 18.8 | 68.1 | 96 |
| 2 | 83 | 38.4 | ——do—— | 3.7 | 3.1 | 282 | 35 | 12.2 | 11.0 | 70.8 | 96 |
| 3 | 101 | 404 | ——do—— | 3.6 | 3.6 | 426 | 27 | 23.3 | 19.5 | 77.1 | 97 |
| 4 | 59 | 39.4 | Mixture of about 70% 2,2-bis(t.-butylperoxy) butane and about 30% of di-(t.-butyl) peroxide. | 4.1 | 2.4 | 267 | 35 | 9.4 | 11.8 | 46.6 | 91 |
| 5 | 89 | 44.5 | Acetyl peroxide [2] | ²1.4 | 4.3 | 171 | 38 | 4.1 | 0 | 82.1 | 93 |
| 6 | 78 | 39 | ——do—— | ²1.7 | 4.3 | 282 | 35 | 4.2 | 0 | 81.5 | 104 |

[1] The per cent of $CF_2=CFCl$ which was converted to recoverable liquid product. In determining this, the weight of catalyst fed was subtracted from the weight of liquid product collected in the receiving flask.
[2] 30% solution in dimethyl phthalate. The "Per Cent In Feed" is calculated on pure acetyl peroxide.

The products from several runs were distilled through a 10 cm. column equipped with a spiral wire packing in order to obtain information as to the distribution of the various fractions.

The distillation data on the product of run No. 1 are as follows:

Results similar to those described in the table with reference to runs 1–4 are obtained when 2,2-bis(tert.-butylperoxy)butane (a liquid at room temperature) alone is used as a catalyst instead of di-(tert.-butyl) peroxide (also a liquid at room temperature) or a mixture of di-(tert.- butyl) peroxide and 2,2-bis(tert.-butylperoxy) butane, the formula for which is

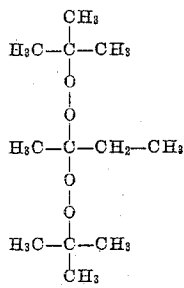

As is shown by the results of runs 5 and 6 acetyl peroxide (diacetyl peroxide) is not effective as a catalyst for the vapor-phase polymerization of monomeric chlorotrifluoroethylene.

Instead of introducing nitrogen to the reaction zone, other gases which are inert during the polymerization reaction may be introduced thereto along with the monomeric chlorotrifluoroethylene and catalyst, for example carbon dioxide, argon, helium, etc. If desired, the polymerization reaction can be effected in the presence of air or oxygen. In other words, the reaction will proceed satisfactorily in the presence of the small amount of air or oxygen which normally might be present in, or be introduced to, the reaction zone during the polymerization.

The temperature at which the polymerization of the monomer is effected should be at least 150° C. and not higher than 450° C. If the temperature in the reaction zone is below 150° C., the time required is too long for practical purposes while at temperatures above 450° C., the proportion of polymers of very low molecular weight (mainly dimer and trimer) becomes excessive.

If desired, the polymerization reaction can be effected at superatmospheric pressure. e. g., at pressures ranging from slightly above atmospheric such as 1.05 atmospheres to a pressure of 500 atmospheres or even as high as 1000 atmospheres. Since the temperatures of polymerization used in practicing our invention are above the critical temperature of monomeric chlorotrifluoroethylene, the monomer is in the vapor phase regardless of the particular pressure employed.

The time of contact between the monomeric chlorotrifluoroethylene and the catalyst can be varied as desired or as conditions may require, e. g., from 10 seconds to 15 minutes or longer. When polymerization is effected within the preferred temperature range of 200°–400° C., the contact time is usually within the range of 15 or 20 seconds to 1 or 2 minutes.

It will be understood, of course, by those skilled in the art that the recovered monomeric chlorotrifluoroethylene can be re-cycled, as by recirculation through the polymerization zone in a continuous system of operation.

In general, the liquid polymers produced as herein described have viscosities within a lubricating oil range.

The polymers resulting from our process can be after-fluorinated if desired, for instance in the manner disclosed in copending Kropa application Serial No. 622,088, filed October 12, 1945, now Patent No. 2,497,046, issued February 7, 1950.

We claim:

1. The method of producing liquid polymeric chlorotrifluoroethylene adapted for use as a lubricant which comprises continuously charging to a conduit leading to a heated reaction zone monomeric chlorotrifluoroethylene and a catalyst selected from the class consisting of di-(tert.-butyl) peroxide, 2,2-bis-(tert.-butyl peroxy) butane and mixtures thereof, the amount of the said catalyst corresponding to from 0.5 to 10% by weight of the monomeric chlorotrifluoroethylene which is charged to the said conduit, preventing any back diffusion of gases from the said heated reaction zone by simultaneously charging to the said conduit, prior to the point of charging thereto the said monomeric chlorotrifluoroethylene and the said catalyst, a gas which is inert during the reaction, the said catalyst and monomer being heated together in the said zone in the presence of the said inert gas at a temperature within the range of 150° C. to 450° C. for a period sufficiently long to form a substantial amount of polymeric chlorotrifluoroethylene which is liquid at room temperature and at atmospheric pressure, and isolating the said polymeric chlorotrifluoroethylene.

2. A method as in claim 1 wherein the monomeric chlorotrifluoroethylene and the catalyst are heated together in the reaction zones in the presence of the inert gas at a temperature within the range of about 200° C. to about 400° C.

3. A method as in claim 1 wherein the catalyst is di-(tert.-butyl) peroxide.

4. A method as in claim 1 wherein the catalyst is 2,2-bis(tert.-butylperoxy)butane.

5. A method as in claim 1 wherein the catalyst is a mixture of di-(tert.-butyl) peroxide and 2,2-bis(tert.-butylperoxy)butane.

6. The method of producing liquid polymeric chlorotrifluoromethylene adapted for use as a lubricant which comprises continuously charging to a conduit leading to a heated reaction zone monomeric chlorotrifluoroethylene and a catalyst selected from the class consisting of di-(tert.-butyl) peroxide, 2,2-bis(tert.-butyl peroxy)butane and mixtures thereof, the amount of the said catalyst corresponding to from 1 to 7% by weight of the monomeric chlorotrifluoroethylene which is charged to the said conduit, preventing any back diffusion of gases from said heated reaction zone by simultaneously charging to the said conduit, prior to the point of charging thereto the said monomeric chlorotrifluoroethylene and the said catalyst, a gas which is inert during the reaction, the said catalyst and monomer being heated together in the said zone in the presence of the said inert gas at a temperature within the range of about 200° C. to about 400° C. for a period sufficiently long to form a substantial amount of polymeric chlorotrifluoroethylene which is liquid at room temperature and at atmospheric pressure, and isolating the said polymeric chlorotrifluoroethylene.

7. A method as in claim 6 wherein the inert gas is nitrogen.

JOHN J. PADBURY.
EDWARD L. KROPA.

REFERENCES CITED

The following references are of record in the file of this patent:

UNITED STATES PATENTS

| Number | Name | Date |
| --- | --- | --- |
| 2,426,476 | Vaughan et al. | Aug. 26, 1947 |

OTHER REFERENCES

Miller et al., "Industrial and Engineering Chem.," vol. 39, pages 333–7 (1947).

Belmore et al., ibid., pages 338–42.